US006428715B1

(12) United States Patent
Abels et al.

(10) Patent No.: US 6,428,715 B1
(45) Date of Patent: *Aug. 6, 2002

(54) METHOD FOR PRODUCING SLIDERS

(75) Inventors: Daniel Gerard Abels, San Francisco; Yu-En Percy Chang, Mountain View; Peter Beverley Powell Phipps, Saratoga; Jila Tabib; Benjamin Lu-Chen Wang, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/692,961

(22) Filed: Oct. 19, 2000

Related U.S. Application Data

(63) Continuation-in-part of application No. 09/219,112, filed on Dec. 22, 1998.

(51) Int. Cl.[7] ............................................. G11B 5/127
(52) U.S. Cl. ......................... 216/22; 216/101; 216/102; 134/2; 252/79.1
(58) Field of Search .................... 134/2, 19, 22.13, 134/22.14, 22.17, 22.19, 30, 34, 36, 42; 216/22, 101, 102; 252/79.1, 79.5

(56) References Cited

U.S. PATENT DOCUMENTS

| | | | |
|---|---|---|---|
| 3,653,095 A | 4/1972 | Dupre et al. ................... 21/2.7 |
| 4,048,121 A | 9/1977 | Chang ......................... 252/527 |
| 4,091,954 A | 5/1978 | Wallace ....................... 228/470 |
| 4,124,407 A | 11/1978 | Binns ........................... 134/3 |
| 4,301,353 A | 11/1981 | Suenaga et al. ........ 219/121 LJ |
| 4,317,685 A | 3/1982 | Ahuja et al. ..................... 134/2 |
| 4,349,448 A | 9/1982 | Steele ......................... 252/135 |
| 4,457,322 A | 7/1984 | Rubin et al. .................... 134/2 |
| 4,477,290 A | 10/1984 | Carroll et al. .................. 148/6 |
| 4,564,585 A | 1/1986 | Blaske et al. ................ 430/313 |
| 4,599,116 A * | 7/1986 | King et al. ..................... 134/2 |
| 4,619,731 A | 10/1986 | Buttry et al. ................ 156/644 |
| 4,787,942 A * | 11/1988 | Wray .......................... 148/254 |
| 4,894,740 A | 1/1990 | Chhabra et al. ............. 360/103 |
| 4,912,883 A | 4/1990 | Chang et al. .............. 51/165 R |
| 4,914,868 A | 4/1990 | Church et al. ........... 51/165.71 |
| 4,940,493 A | 7/1990 | Neidffer et al. ................. 134/3 |
| 5,203,119 A | 4/1993 | Cole ........................ 51/165.77 |
| 5,335,458 A | 8/1994 | Stoffers et al. ................ 51/317 |
| 5,462,636 A | 10/1995 | Chen et al. .................... 216/17 |
| 5,567,333 A | 10/1996 | Hira et al. ...................... 216/22 |
| 5,650,893 A | 7/1997 | Bolasna et al. .............. 360/103 |
| 5,665,251 A * | 9/1997 | Robertson et al. ............. 216/22 |
| 5,687,045 A * | 11/1997 | Okai et al. .................... 360/120 |
| 5,835,315 A | 11/1998 | Cohen et al. ................ 360/126 |
| 5,872,684 A | 2/1999 | Hadfield et al. ............. 360/103 |
| 5,910,864 A | 6/1999 | Hira et al. ................... 360/103 |
| 6,051,148 A * | 4/2000 | Perry et al. .................. 216/102 |
| 6,069,770 A * | 5/2000 | Cui et al. ..................... 360/103 |
| 6,190,237 B1 * | 2/2001 | Huynh et al. ................ 438/692 |
| 6,322,687 B1 * | 11/2001 | Heimann et al. ........... 205/199 |

* cited by examiner

*Primary Examiner*—Randy Gulakowski
*Assistant Examiner*—Allan Olsen
(74) *Attorney, Agent, or Firm*—Robert B. Martin

(57) ABSTRACT

A method for producing sliders without alumina overcoat protrusion on the air bearing surface. The method comprises a method for removing alumina protrusion on the air bearing surface of a slider comprising contacting the air bearing surface of the slider with an aqueous base having a pH of about 9 to about 11.

6 Claims, 4 Drawing Sheets

METHOD FOR PRODUCING SLIDERS

This application is a continuation-in-part of U.S. patent application Ser. No.: 09/219,112 filed Dec. 22, 1998.

BACKGROUND OF THE INVENTION

1. Field of the Invention

The present invention relates to an improved method for manufacturing sliders. More particularly, the invention relates to an improved method for removing unwanted alumina from the alumina overcoat on a slider.

2. Description of the Background Art

Digital magnetic recording devices for data storage generally comprise a thin film magnetic recording disk and a head or transducer which is moved above the surface of the rotating disk to electromagnetically read and write information on the disk. Advanced thin film magnetic recording disks generally comprise a rigid substrate, a magnetic layer such as a cobalt-based metal alloy, a protective amorphous carbon layer and a lubricant layer, such as a perfluoropolyether disposed on the carbon overcoat.

During operation of the disk drive system, an actuator mechanism moves the magnetic transducer to a desired radial position on the surface of the rotating disk where the head electromagnetically reads or writes data. Usually, the head is integrally mounted in a carrier or support referred to as a "slider". The slider is generally rectangular in shape and consists of two portions, i.e., a slider portion and a head portion formed on an end face of the slider portion. Typically, this end face of the slider will constitute the slider trailing edge when the slider is suspended adjacent to a rotating recording disk.

The slider portion, which constitutes the bulk of the thin film head slider, is made of a ceramic material such as $Al_2O_3$—TiC or another suitable material. The head portion of the slider typically is a thin layer of alumina formed on the trailing edge face of the slider portion in which the magnetic portion of the head is embedded.

A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions (air bearing design) on its air bearing surface (ABS) which enable the slider to fly at a constant height close to the disk during operation of the disk drive.

The recording density of a magnetic disk drive is dependent on the distance between a transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the varying magnetic fields emanating from closely spaced regions on the disk.

However, the benefit of a closer spacing is constrained by the adverse effect on the mechanical reliability. As the distance between the slider and the disk decreases, as it does with every generation of storage device, the probability of contact between the two increase which causes wear on both contacting surfaces that could ultimately lead to loss of data.

The point on the slider that has the highest probability of coming in contact with the disk is the alumina overcoat on the trailing surface because sliders fly with a positive pitch. The probability of contact between the slider and disk increase when the alumina on the trailing edge protrudes above the air bearing surface of the slider. Referring to FIG. 1, there is shown a slider 10 comprising slider portion 12 and head portion 14 together forming the air bearing surface 16 of the slider. The head portion 14 of the slider comprises an alumina undercoat 20, read and write head elements 22, 24 and 26, and the alumina overcoat 28. Referring to FIG. 2, there is shown an alumina overcoat 28 of slider 10 protruding above the ABS surface of slider portion 12, thereby substantially increasing the probability of contact with the disk. Protrusion of the overcoat of alumina can result from (i) lapping of the air bearing surface (ABS) or (ii) from operation of the slider. During operation of the slider, there is an increase in the temperature of the slider and the differences in coefficient of thermal expansion of the slider components can result in protrusion of the alumina overcoat.

In the manufacturing of sliders, a large number of sliders are fabricated from a single wafer having rows of the magnetic transducers deposited simultaneously on the wafer surface using semiconductor-type process methods. In one process embodiment, after deposition of the heads is complete, the wafer is cut into four quadrants. Each quadrant is then bonded to a lapping fixture and lapped on a lapping plate to provide accurate head dimensions. After lapping, single row bars of sliders are cut from the wafer quadrant. These row bars may then be lapped again on the ABS, and the ABS design is etched in each slider using art-known lithographic techniques. Lastly, the row bars are adhered to suitable tape; and each bar is diced, i.e., separated with a diamond-cut saw into individual sliders, each having a magnetic head terminating at the ABS. Each slider is then cleanly removed from the tape, inspected to insure operability of the magnetic head, and attached to an actuator for use in a magnetic disk drive.

Unfortunately, as discussed above, the lapping process can result in an alumina overcoat protrusion which will increase the probability of contact between the disk and slider. Therefore, there still is a need in the art for a slider manufacturing process which results in sliders without alumina overcoat protrusion.

It is, therefore, an object of the present invention to provide an improved method for the manufacturing of magnetic sliders. Other objects and advantages will become apparent from the following disclosure.

SUMMARY OF THE INVENTION

The present invention relates to a method for producing magnetic sliders without alumina overcoat protrusion. After lapping of the ABS of the slider, the method of the present invention involves contacting the trailing alumina (ABS) surface of the slider with an aqueous base solution having a pH of about 9 to about 13, preferably about 10 to about 11. Preferably the base solution is buffered. Preferably the solution is aqueous potassium carbonate/bicarbonate. The method of the present invention can be practiced without the need for any masking of the ABS surface to protect the surface, e.g. patterned portions of the surface.

A more thorough disclosure of the present invention is presented in the detailed description which follows and the accompanying figures.

DETAILED DESCRIPTION OF THE INVENTION

Figure 1:
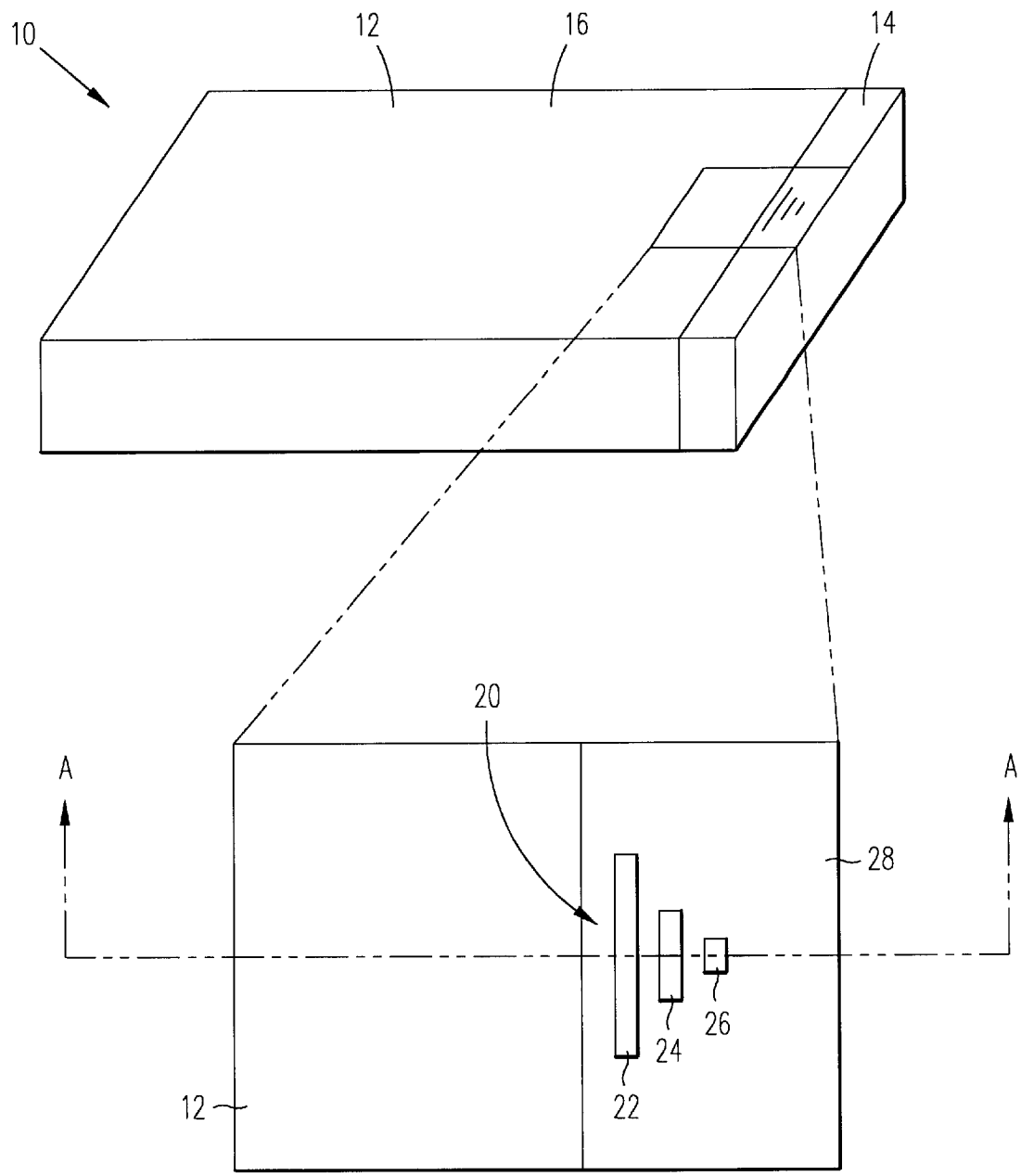
FIG. 1 is a perspective view of an unfinished slider and a view depicting the detailed structure of the head area of the slider.
Figure 2:
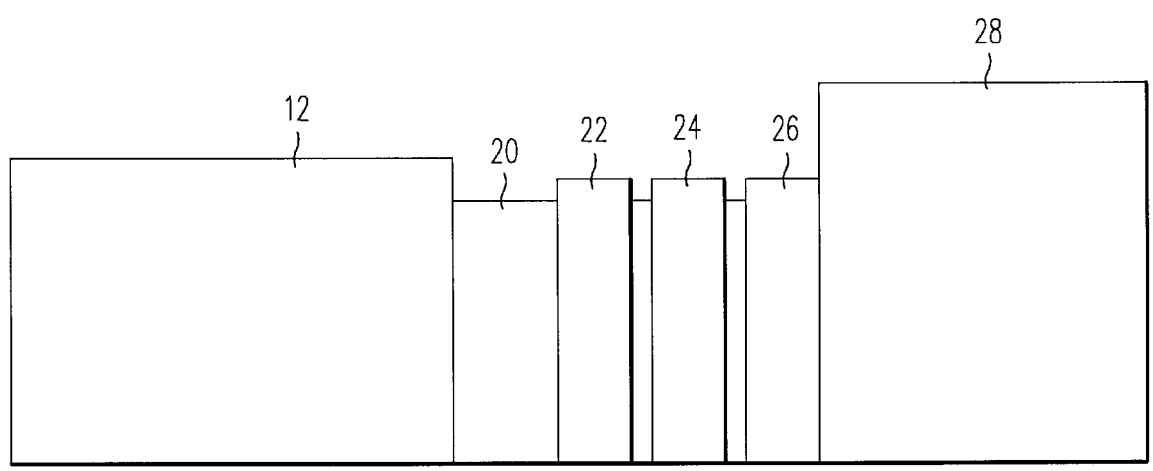
FIG. 2 is a cross sectional view of the slider of FIG. 1 along line 9.
Figure 3:
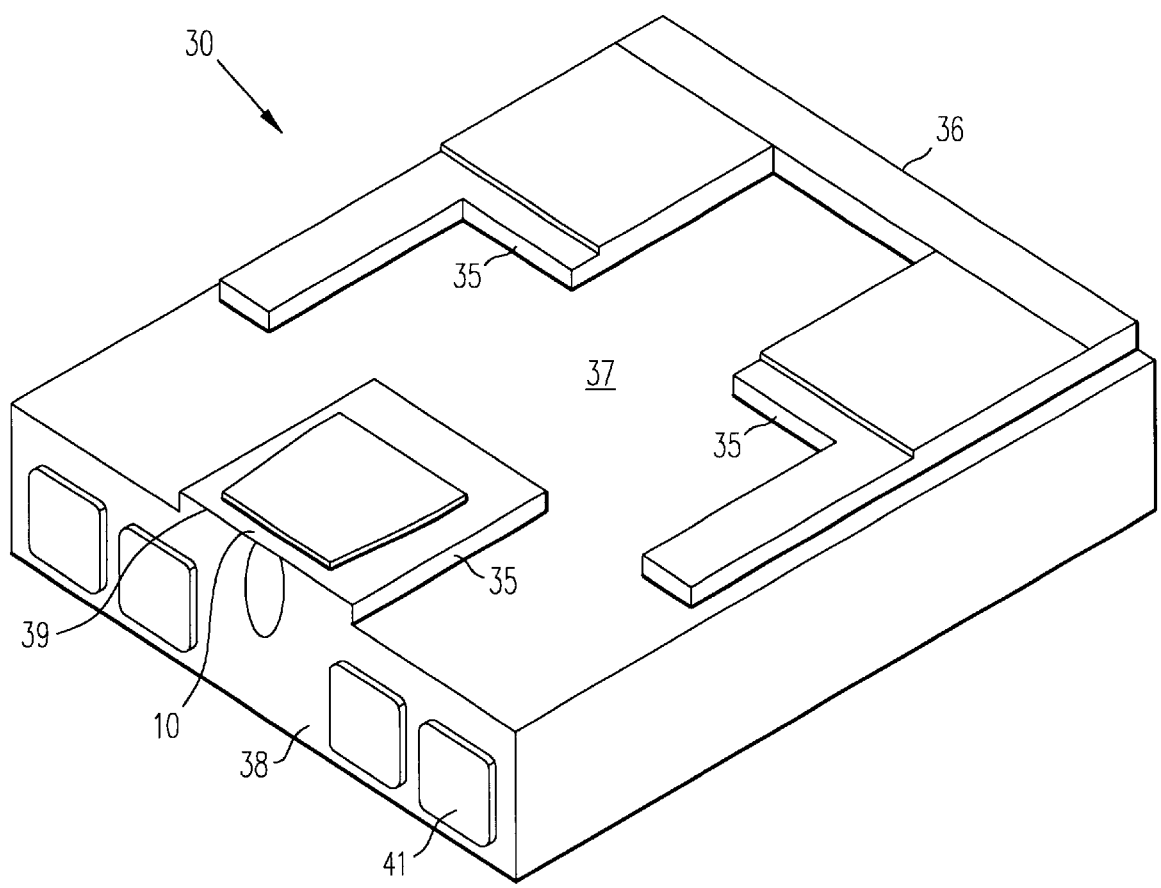
FIG. 3 is a perspective view of a finished slider.

The present invention relates to an improved method for manufacturing sliders. Referring to FIG. 3, there is shown a typical finished thin film head slider 30 with a negative pressure ABS. The slider 30 is generally rectangular in shape. It consists of two portions, i.e., a slider portion and a head portion, formed on an end face of the slider portion. Typically, this end face of the slider constitutes the slider trailing surface when the slider is suspended adjacent to a rotating recording disk.

The slider portion, which constitutes the bulk of the thin film head slider 30, is made of a ceramic material such as $Al_2O_3$—TiC or other suitable material. In one embodiment, the ABS of the slider comprises, as shown, three dual-depth step pads 35 disposed on a recessed face 37 of the slider 30. Two step pads are at the leading edge 36 and one is at the trailing edge 39. The trailing edge 39 is at the intersection of the ABS and trailing surface 38. The head 10 is suitably located on the single step pad near the trailing surface 38 of the slider 30. The step pads 35 and the recessed face 37 are all important structural features which enable the head 10 to glide at a short distance above the surface of a magnetic disk. A variety of other ABS designs are known in the art, such as disclosed in U.S. Pat. No. 5,650,893 (for negative pressure design) and U.S. Pat. No. 4,894,740 (for positive pressure design), the disclosures of which are incorporated herein by reference.

The head is typically formed in a thin layer of alumina deposited on the trailing surface of the slider. Suitably, it is a magnetoresistive read element and an inductive element for writing data. Electrical terminal pads 41 provide electrical connection for the magnetic head elements.

Figure 4:
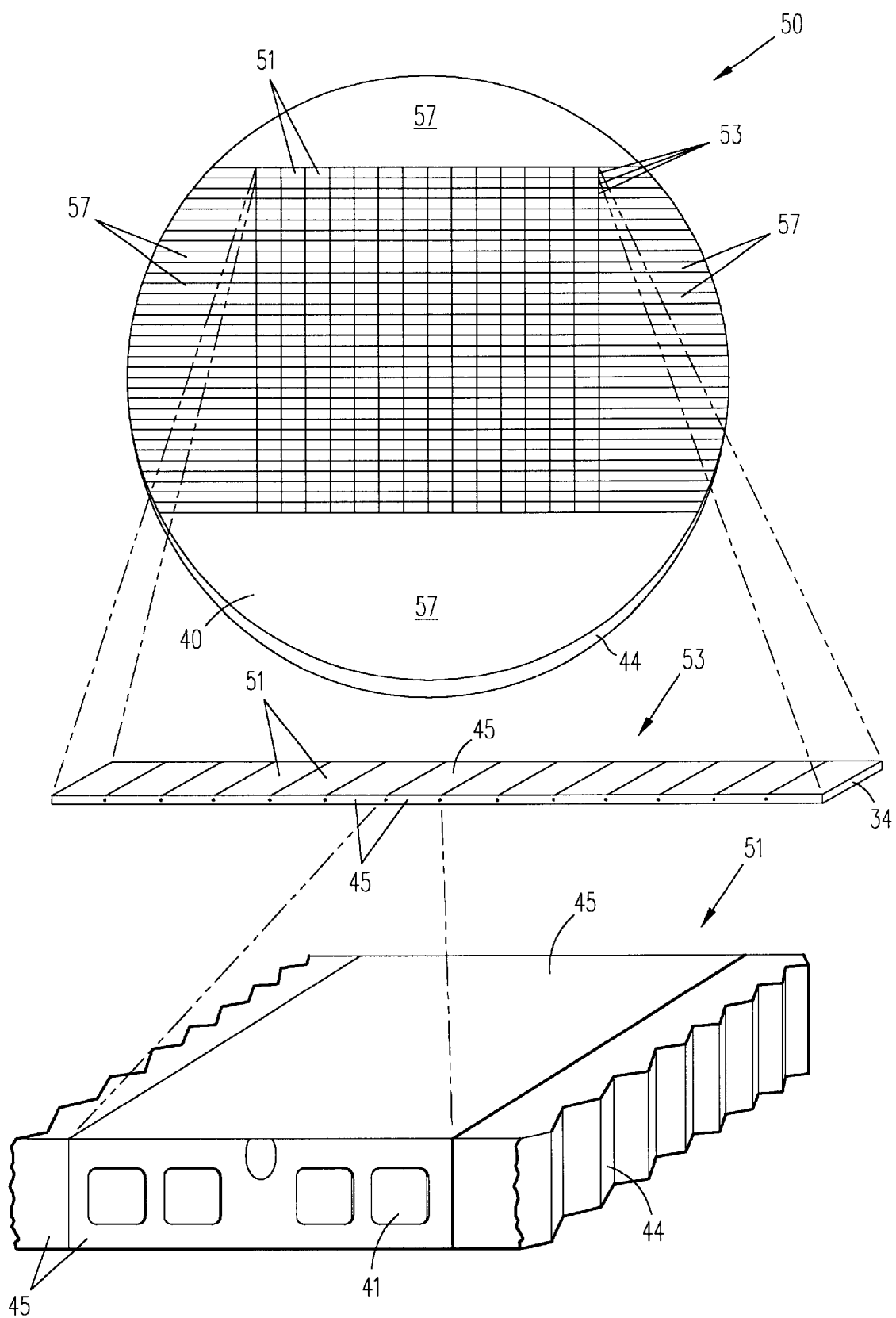
FIG. 4 is a perspective view of a wafer element having a plurality of magnetic heads fabricated thereon in rows and depicting the detailed structure of a row and a slider.

Referring to FIG. 4, the above-described thin film head slider 30 has been fabricated from a preprocessed wafer 50, as shown in FIG. 4, or from a wafer quadrant. The wafer 50 comprises a wafer substrate 44 which is suitably covered by a thin layer 40 of alumina. The magnetic head device is formed in the layer 40. The magnetic heads are arranged in rows and are suitably identically oriented in the trailing surface 45 of slider row 53. Typically, the thickness of the wafer substrate 44 is equal to the length of the finished slider 30.

The wafer 50 comprises a matrix of slider units 51 arranged in rows 53 which when fully processed will become sliders 30. The view shown in FIG. 4 is an end view of the individual slider units 51 with the magnetic heads having been formed on the trailing surface of the slider units 51. As shown in FIG. 4, a plurality of identical row bars 53, each comprising a row of identical slider units 51, together with superfluous sections, such as top, bottom and side sections 57 where no slider units are formed constitute the wafer 50. Slider row 53 has trailing surface 41, and a top surface 45 which will be modified to form the ABS. The wafer may be fabricated to contain any desirable number of rows 53 of slider units 51 and any desirable number of slider units 51 in each row, depending on the size of the wafer and the size of the sliders.

The slider unit 51 shown in FIG. 4 is identical with the finished slider 30 shown in FIG. 3, except that the ABS is not yet formed and the throat and stripe heights for the head elements are greater in the unfinished slider unit 51. The wafer is preferably cut into four quadrants and each quadrant is lapped to obtain the desired throat and element heights. The desired throat heights and head element heights are achieved by the provision of lapping guides. The lapping guides are then used as indicators of element height during the lapping process for the slider units 51. The final height of the element may be determined by measuring the resistance of the element itself. See, for example, U.S. Pat. Nos. 4,914,868 and 4,912,883, the disclosure of which are incorporated herein by reference for all purposes.

When fabrication of the magnetic heads on the sliders is complete at the quadrant level, the quadrant is sliced into rows of the slider. In an alternative embodiment, the wafer can be first sliced into rows, and then the individual rows can be lapped to achieve desired throat and element heights.

After a row of sliders is cut from the wafer quadrant, suitably the ABS of the slider row (the ABS side of the individual sliders in the slider row) is lapped using art known techniques. After the ABS of the slider row has been lapped, the trailing edge of the slider row is contacted with an aqueous base having a pH of about 9 to about 13. Preferably, the aqueous base has a pH of about 10 to about 11, more preferably about 10.4 to about 11, and most preferably about 10.6. Preferably, the base solution is buffered. Preferably, the base solution is an aqueous alkali salt of a weak acid such as an alkali carbonate/bicarbonate such as potassium carbonate and potassium bicarbonate, or a mixture of sodium borate and sodium hydroxide. Other suitable aqueous base solutions include alkali hydroxide, such as sodium hydroxide, or alkaline earth hydroxide, such as calcium hydroxide. Suitably, the solution also comprises a surfactant for the purpose of wetting the surface uniformly to produce a uniform etch rate of the alumina.

Suitable surfactants include Liquinox and Alfonic 610-50 sold by Pacific Pac International, and Triton X-100 sold by Kodad (trademark of Rohm & Haas). Suitably, the aqueous base solution will comprise about 0.02 to about 0.3 molar of the base and about 0.004% to about 0.1% by volume of the surfactant, preferably less than the critical micelle concentration.

Suitably, the slider or the slider row is immersed in a filtered, stirred aqueous based solution at a temperature of about 15° to about 45° preferably about room temperature for a short period of time (e.g., 5–15 minutes). Preferably, the amount of alumina overcoat removed (etched off) by the base is about 1 nm/minute.

The sliders can be processed at the row or slider level. The process removes the alumina overcoat protrusion without affecting the performance of the magnetic layer and without unacceptable etching of other areas of the slider.

After lapping of the ABS and removing the alumina overcoat protrusion, each row is suitably removed from the holder and bonded to a carrier for further processing to form the ABS pattern on the top side 45 of the row. The ABS pattern is etched in each slider using art known as lithographic techniques.

The step of producing a chosen ABS pattern on the slider can be carried out by art known process such as etching, ion milling or other machining technique, or by laser ablation such as described in U.S. Pat. No. 4,301,353.

The row of sliders is then suitably debonded from the carrier and bonded to an adhesive tape for the dicing process where vertical cuts are made in the row to separate each individual slider.

The method of the present invention provides the following advantages:

a) The probability of sustaining damage to the slider is reduced by removing the surface damage which is associated with abrasive polishing.

b) The probability of damage to the disk is reduced by rounding the trailing edge of the slider.

c) The mechanical reliability of the flying slider is enhanced and made more predictable by precluding protrusion.

d) The facilities, the materials and the process time of the operation are all inexpensive.

e) The chemicals are environmentally benign.

f) The process cleans the sliders.

g) The process causes no degradation of the magnetic or mechanical performance.

h) The process can be performed with or without lithographic masking because the etchant does not degrade the photoresist masks.

The following examples are detailed descriptions of the method of the present invention. The detailed descriptions fall within the scope of, and serve to exemplify, the more generally described invention set forth above. The examples are presented for illustrative purposes only, and are not intended as a restriction on the scope of the invention.

EXAMPLE I

An aqueous buffered base solution having a pH of 11.06 was prepared. This solution contained 0.15 M $Na_2CO_3$ and 0.03 M $NaHCO_3$ with 0.02% by volume of Triton-X surfactant added. Sliders were immersed in the solution at 21° C. and the alumina overcoat etch rate was 1.46 nm/minute.

The etching measurements were made using Wyko interferometer. The results of etching for 10 minutes are as follows:

|         | Before Etching |                | After Etching   |                | Difference       |                |
|---------|----------------|----------------|-----------------|----------------|------------------|----------------|
| (In nm) | Etched         | Controls       | Etched          | Controls       | Etched           | Controls       |
| S2/P1*  | −1.96 ± 3.01   | −1.88 ± 3.18   | −3.93 ± 2.76    | −3.17 ± 3.08   | −1.97 ± 1.33     | −1.29 ± 1.17   |
| OC**    | 0.72 ± 3.75    | 1.06 ± 3.26    | −13.88 ± 4.92   | 0.37 ± 3.29    | −14.60 ± 2.97    | 0.69 ± 0.90    |
| P2*     | −1.44 ± 3.63   | −0.87 ± 3.08   | −2.20 ± 3.30    | −2.04 ± 3.35   | −0.76 ± 2.15     | −1.17 ± 2.33   |
| S1*     | 0.88 ± 2.63    | 0.80 ± 2.64    | −0.70 ± 2.26    | −0.07 ± 2.49   | −1.58 ± 0.98     | −0.87 ± 0.84   |

*magnetic head elements   **alumina overcoat

EXAMPLE II

A preferred aqueous solution consists of 0.042 molar potassium bicarbonate, 0.158 molar potassium carbonate, and 0.01% by volume of Alfonic 610-50 surfactant. The pH of the resulting solution is 10.6 when the temperature is maintained at 20° C. (approximately room temperature). The amount of alumina overcoat removed is 10 nm in 10 minutes.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

We claim:

1. A method for removing alumina from the unmasked air bearing surface of a slider comprising contacting the unmasked air bearing surface of the slider with an aqueous base having a pH of about 9 to about 11 wherein the base is a mixture of an alkali bicarbonate and alkali carbonate.

2. The method of claim 1, wherein the base has a pH of about 10 to about 11.

3. The method of claim 2, wherein the aqueous base further comprises a surfactant.

4. The method of claim 1, wherein the base is a mixture of potassium carbonate and potassium bicarbonate.

5. The method of claim 1, wherein the base is buffered.

6. The method of claim 1, wherein the aqueous base is at a temperature of about 15° C. to about 45° C.

* * * * *